Figure 1:
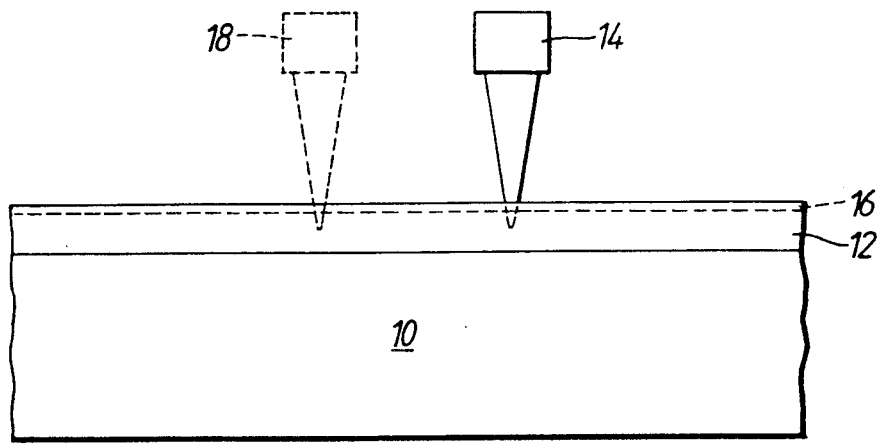

United States Patent [19]

Brettle et al.

[11] Patent Number: 5,061,582

[45] Date of Patent: Oct. 29, 1991

[54] OPTICAL DATA STORAGE

[75] Inventors: Jack Brettle; Ian Bennion; Christopher J. Groves-Kirkby, all of Northampton, England

[73] Assignee: Plessey Overseas Limited, Ilford, England

[21] Appl. No.: 348,500

[22] PCT Filed: Jun. 16, 1988

[86] PCT No.: PCT/GB88/00469

§ 371 Date: Apr. 14, 1989

§ 102(e) Date: Apr. 14, 1989

[87] PCT Pub. No.: WO88/10494

PCT Pub. Date: Dec. 29, 1988

[30] Foreign Application Priority Data

Jun. 17, 1987 [GB] United Kingdom ............... 8714202

[51] Int. Cl.⁵ ............... G11B 7/24; G03C 1/73; G03C 1/825

[52] U.S. Cl. .................. 430/19; 430/270; 430/343; 430/495; 430/945; 430/962

[58] Field of Search ............ 430/19, 343, 270, 495, 430/945, 962

[56] References Cited

U.S. PATENT DOCUMENTS 4,186,002  1/1980  Heller et al. ............... 430/1
4,737,427  4/1988  Miyazaki et al. ............ 430/19
4,737,449  4/1988  Heller et al. .............. 430/343

FOREIGN PATENT DOCUMENTS 2823341   5/1979   European Pat. Off. .
0014046   8/1980   European Pat. Off. .
0190016   8/1986   European Pat. Off. .
0193931   9/1986   European Pat. Off. .
62-287246 12/1987  Japan .
63-11933  3/1988   Japan .
1271655   4/1972   United Kingdom .
8607715   3/1986   United Kingdom .

OTHER PUBLICATIONS

"The Allen Clark Research Centre Annual Review 1977", by R. J. Hurditch et al., pp. 66–74.
Royal Society of Chemistry, Special Publication, vol. 60 1986, pp. 120–135, by H. G. Heller.

*Primary Examiner*—Charles L. Bowers, Jr.
*Assistant Examiner*—Mark R. Buscher
*Attorney, Agent, or Firm*—Fleit, Jacobson, Cohn, Price, Holman & Stern

[57] ABSTRACT

The invention describes an optical data storage medium in which the optical contrast of stored data bits is enhanced by the use, as a photosensitive material or as an additional photosensitive material, of a layer of a photochromic fulgide.

5 Claims, 1 Drawing Sheet

OPTICAL DATA STORAGE

It is known to store information in digital form wherein a "laser sensitive" material is exposed to the action of a laser beam to provide a "bit" of information. For example optical data storage discs are known where exposure to a laser beam causes photo-ablation, physical deformation, or magnetic or optical density changes. The recorded information can then be read by sensing the change which has occurred. A problem exsists, whatever medium is used for the recording, in that the profile of intensity of the laser beam is usually gaussian ie. the beam is of lesser intensity at its edges. For best operation, it would be preferable if the profile were of the "top-hat" type, that is constant intensity across the beam. Bit edges would then be more sharply defined allowing greater bit packing density and hence greater optical data storage.

In our co-pending U.K. patent application No. 8607715, we describe the use of photochromic fulgides and fulgimides to provide enhanced contrast in photo resist technology. The term "fulgide" as used herein includes fulgimides and other similar bistable photochromic compounds. In this application, there is described a technique in which a photochromic fulgide is employed. The fulgide can exist in two photochemically interconvertible states, one of which is a UV absorbing colourless compound which by the absorption of UV light changes to a second, UV transparent, visible light absorbing (coloured), compound. The second compound, by absorption of visible light, can be made to revert to the colourless form. In contrast enhanced resist technology, a film of UV absorbing material is locally exposed to UV light, and is thus converted to a UV transparent material which acts as a mask for the layer or layers beneath.

This approach is known in lithography as the portable conformable mask (PCM). It can be seen therefore that, by their nature, photochromic materials produce an artificial contrast enhancement effect. This may be used in one of two ways, either with a thin photochromic film, acting as a PCM on layers below in which it is intended to produce an image, or with a single photochromic layer where the outer surface acts as an automatic contrast enhancer for the material below.

It is an object of the present invention to provide an improved recording medium for optical data storage.

According to the present invention, there is provided an optical data storage medium comprising a support and at least a first layer consisting of a photochromic fulgide (as herein defined) having first and second stable states, the photochromic fulgide whilst in its first state being responsive to light of a first wavelength to change state and to become transparent to said first wavelength light and, in said second state, being responsive to light of a second wavelength to revert to its first state.

Figure 2:
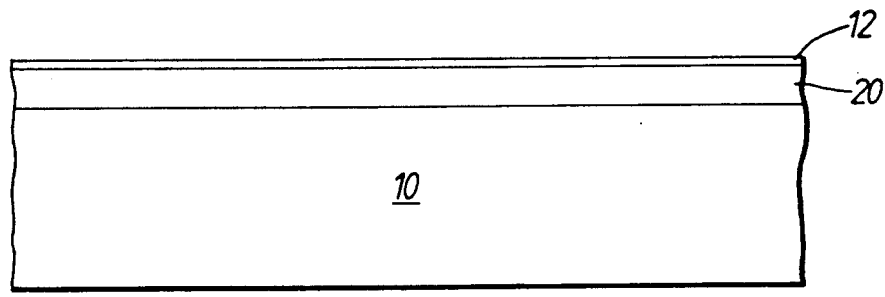
Figure 3:
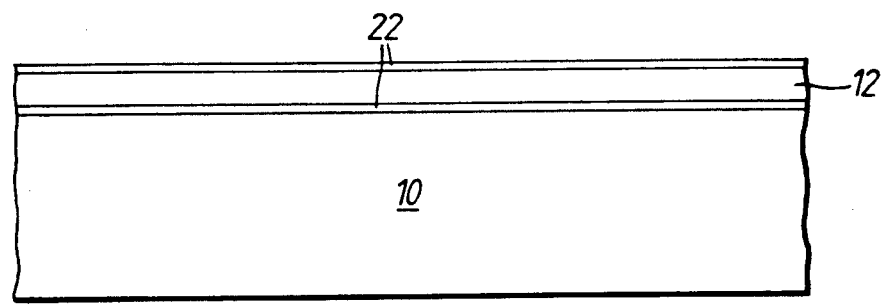
Figure 4:
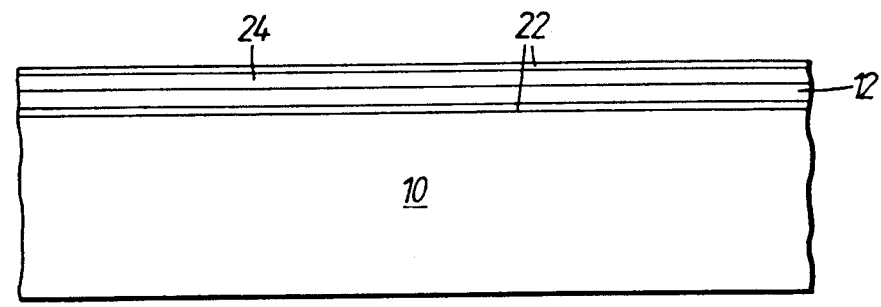

The invention will be described further, by way of example, with reference to the accompanying drawings, in which:

FIG. 1 is a schematic cross-section of a portion of an optical data storage medium in accordance with the present invention; and FIGS. 2, 3 and 4 are similar view of further embodiments of optical data storage medium each in accordance with the present invention.

Referring firstly to FIG. 1, there is shown a fragmentary portion of an optical data storage medium constructed in accordance with the present invention. The medium comprises a support 10 which may be in the form of a circular disc having on its upper surface a layer 12 of a photochromic fulgide material. Such materials are known per se and are described in, inter alia, "The Allen Clark Research Centre Annual Review 1977" page 66 by R. J. Hurditch and C. J. Kirkly and also in a paper by H. G. Heller published by the Royal Society of Chemistry, Special Publication, vol. 60 (1986) pp 120–135.

As stated above the term "fulgide" as used herein includes fulgimides and other chemically similar bistable photochromic compounds.

The photochromic fulgide layer 12 has two stable states. In its first state, it is colourless and absorbs light of a first wavelength, for example, ultra-violet radiation and is photochemically converted thereby to a second coloured state in which it is transparent to light of the first wavelength. In its second state it absorbs light of a different wavelength or range of wavelengths such as visible light and is bleached thereby to its colourless, light of the first wavelength absorbing, first state.

A light source 14 is provided. The source 14 provides a writing light and is focussable onto the surface of the layer 12.

The source 14 may be a frequently-doubled, semiconductor infrared laser, a short wavelength infrared laser of a gas laser.

If the layer 12 is first given a blanket exposure to ultra-violet light, it becomes coloured ie. it is in a first stable state. Thereafter it may be written to by the source 14 to bleach the layer 12 in the locally exposed areas (bits) against a coloured background.

If the layer 12 is a single layer of the photochromic fulgide, the upper portion 16 thereof acts as a contract enhancing mask for exposure of the remainder of the layer 12.

It is to be noted that the support 10 may be transparent and that exposure could be made through the support. In any case, the exposed layer 12 may be read by reflection or transmission of light (not of the first wavelength) of a lower intensity. This may be effected by a second source 18 as shown in dashed lines in FIG. 1.

Referring now to FIG. 2, a second embodiment of optical data storage medium is shown. In this embodiment, a support 10 is coated with a recording material 20 which may be photo-sensitive or thermo-sensitive. A layer 12 of the photochromic fulgide is coated onto the upper surface of the layer 20. The medium is converted to, of the baking process after coating converts it to, its coloured state and sensitive to visible light. It is then written to by a source such as the source 14 shown in FIG. 1. Local area bleaching of the photochromic fulgide layer 12 renders it transparent to the writing light and permits exposure of the subjacent material 20, the layer 12 acting as a mask therefor. After such exposure, the layer 20 can subsequently be read. As stated in relation to FIG. 1, the exposures may be made through the support 10 in which cause the layers 12 and 20 are inverted.

The embodiment shown in FIG. 3 comprises a support 10 having a layer 12 of the photochromic fulgide (of layers 12 and 20 of the fulgide and another photoresponsive material) sandwiched between partially reflective layers 22 and constituting therewith a Fabry-Perot cavity. By careful selection of mirror reflectivities and utilising to the full, the non-linear properties of the layer 12, an intrinsic bistable reflection or transmission response can be obtained. Thus, appropriate exposure of the storage medium 12 in this way gives a well defined threshold for switching. Switching energies are reduced relative to those required in writing to or reading from simple photochromic layers (such as that shown in FIG. 1) by a factor equivalent to the cavity finesse (typically 20×).

In the embodiment shown in FIG. 4, use is made of bistability in polarization rather than in density by the incorporation into the Fabry-Perot structure shown in FIG. 3, of a birefringent layer. The resultant structure comprises a support 10 carrying opposed partially reflecting layers 22 having sandwiched therebetween a layer 12 of a photochromic fulgide (or, as shown in FIG. 2, a layer 12 of a photochromic fulgide and a layer 20 of some other photoresponsive material) to form a Fabry-Perot cavity. A layer 24 of a birefringent material is interposed, in the sandwich, between the layer 12 and that layer 22 nearest the writing light source. The source is preferably of the same kind as the source 14 shown in FIG. 1.

The invention is not confined to the precise details of the foregoing examples and variations may be made thereto.

As stated above, the support 10 may be transparent and writing or reading performed from either side of the medium, the arrangement of the layers being appropriately orientated. Reading may be effected by transmission or reflection.

It is intended that the medium be used as a write-once-read-many-times (WORM) type medium. However, depending on the photoresponsive material used, erasure may be effected. For example, in the case where the layer 12 of photochromic fulgide is the only photosensitive medium, it can readily be wiped by a blanket or selective exposure to UV light. Other reversible photosensitive materials may be used as the layer 16 with similar results.

The source 14 may be a dual source enabling both writing and erasure.

The support 10 is conventionally of circular disc form and the source 14 is arranged for radial movement relative to a rotating disc. Other forms of optical data storage medium are known and the medium of the present invention may take such forms.

We claim:

1. An optical data storage medium comprising a support and a photosensitive layer, exposure of said layer by a writing light of a first wave length serving to record optical data in an optically readable form therein, the improvement comprising a layer superjacent, relative to exposing light, to said photosensitive layer, said superjacent layer being comprises of a photochromic substance selected from photochromic fulgides, of the kind having first and second stable states, said photochromic substances whilst in its first stable state being responsive to the light of said first wavelength to change its state and to become transparent to light of said first wavelength, and, in its second stable state, being responsive to light of a second wavelength to revert to its first stable state.

2. An optical data storage medium as claimed in claim 1 wherein said photosensitive layer and said superjacent layer each include one of said photochromic substances.

3. An optical data storage medium as claimed in claim 1 wherein said light of said first wavelength is ultraviolet light and said light of said second wavelength is visible light.

4. An optical data storage medium as claimed in claim 1 further including reflective layers sandwiching said photosensitive and superjacent layers to form therewith a Fabrey-Perot cavity.

5. An optical data storage medium as claimed in claim 4 further including a birefringent layer between said reflective layers.

* * * * *